United States Patent
Suh et al.

(10) Patent No.: US 7,153,540 B2
(45) Date of Patent: Dec. 26, 2006

(54) RECORDING LAYER OF MAGNETO-OPTICAL STORAGE MEDIUM HAVING SUBLAYER AND METHOD OF FABRICATING THE SAME

(75) Inventors: Dong Woo Suh, Daejon-Shi (KR); Ho Jun Ryu, Daejon-Shi (KR); Yeung Joon Sohn, Daejon-Shi (KR); Yong Woo Park, Daejon-Shi (KR); Mun Cheol Paek, Daejon-Shi (KR)

(73) Assignee: Electronics and Telecommunications Research Instititue (KR)

( * ) Notice: Subject to any disclaimer, the term of this patent is extended or adjusted under 35 U.S.C. 154(b) by 38 days.

(21) Appl. No.: 10/721,636

(22) Filed: Nov. 24, 2003

(65) Prior Publication Data

US 2004/0115482 A1 Jun. 17, 2004

(30) Foreign Application Priority Data

Dec. 17, 2002 (KR) ............... 10-2002-0080550

(51) Int. Cl.
*B05D 3/02* (2006.01)
*B05D 7/14* (2006.01)

(52) U.S. Cl. ............... 427/130; 427/127; 427/128; 427/131; 427/132; 427/383.1

(58) Field of Classification Search ........... 427/127, 427/128, 130, 131, 132, 404, 383.1
See application file for complete search history.

(56) References Cited

U.S. PATENT DOCUMENTS

| | | | | |
|---|---|---|---|---|
| 5,603,766 A | * | 2/1997 | Visokay et al. | 117/105 |
| 5,663,935 A | * | 9/1997 | Nishimura | 369/13.51 |
| 5,824,409 A | * | 10/1998 | Sellmyer et al. | 428/332 |
| 5,863,649 A | * | 1/1999 | Hirokane et al. | 428/332 |
| 6,183,606 B1 | | 2/2001 | Kuo et al. | |
| 6,780,291 B1 | * | 8/2004 | Kim | 204/192.2 |
| 2001/0036562 A1 | * | 11/2001 | Sellmyer et al. | 428/694 T |

FOREIGN PATENT DOCUMENTS

| | | |
|---|---|---|
| JP | 07-244876 | 9/1995 |
| JP | 08-096429 | 4/1996 |
| KR | 1020000025143 | 5/2000 |

OTHER PUBLICATIONS

J.P. Liu et al., *High Energy Products in Rapidly Annealed Nanoscale Fe/Pt Multilayers*, Appl. Phys. Lett. 72(4), pp. 483-485, Jan. 26, 1998.

* cited by examiner

Primary Examiner—Kirsten Jolley
(74) Attorney, Agent, or Firm—Blakely Sokoloff Taylor & Zafman

(57) ABSTRACT

A recording layer of a magneto-optical storage medium having a sublayer in accordance with the present invention comprises a recording layer on which information is recorded and stored; and a sublayer formed above or below the recording layer and made up of an alloy containing a transition metal, wherein a magnetic anisotropy energy of the sublayer is exchange-coupled to the recording layer, thereby enhancing a coercive force of the recording layer. The sublayer may be formed in a single-layered structure having one layer, or in a multi-layered structure having a plurality of layers. The sublayer is preferably made up of an alloy containing a transition metal used for the recording layer. According to the present invention, the coercive force of the recording layer can be increased by an exchange coupling effect between the recording layer and its adjacent sublayer, and thus, the stability of the magnetic domain in the recording layer can be improved. Therefore, the size of the magnetic domain can be significantly reduced, and the density of recording can be increased.

9 Claims, 2 Drawing Sheets

RECORDING LAYER OF MAGNETO-OPTICAL STORAGE MEDIUM HAVING SUBLAYER AND METHOD OF FABRICATING THE SAME

BACKGROUND OF THE INVENTION

1. Field of the Invention

The present invention relates to a recording layer of a magneto-optical storage medium having a sublayer, and more specifically, to a recording layer of a magneto-optical storage medium having a sublayer which is formed to be adjacent to the recording layer in order to increase a density of recording of the magneto-optical storage medium, thereby increasing a coercive force of the recording layer to enhance a magnetic stability of the magnetic domain, so that the size of the magnetic domain can be stably reduced, and a method for fabricating the recording layer.

2. Description of the Prior Art

In recent years, demands for a medium capable of recording and reproducing information with a high density have been increased. Accordingly, much attention has been also paid to a high density recording device using a laser beam. In particular, a magneto-optical storage medium can be used as a device capable of repeatedly recording and erasing information with a high density. Therefore, it is expected that researches and developments of the magneto-optical storage medium will proceed continuously and greatly.

In the magneto-optical storage medium, information is recorded by forming a magnetic domain in a vertically magnetized thin film with a laser beam and a magnetic field, and the information is reproduced by using a magneto-optical effect. The recording layer used in the magneto-optical medium is made up of an RE-TM alloy containing a rare earth element and a transition metal. The transition metal includes ferromagnetic elements such as Fe, Co, etc., and the rare earth element includes Tb, Dy, Gd, Sm, Ho, etc.

The most important purpose of the magneto-optical storage medium is to record information as much as possible in one unit area, that is, to increase the density of recording. Thus, in order to increase the density of recording, it is necessary that the size of the magnetic domain in the recording layer is reduced. In addition, it is necessary that the laser beam has a short wavelength since the recording and reproducing of the information is affected by the wavelength of the laser beam.

In the prior art, a red laser beam has been used as a light source for the recording and reproducing in the magneto-optical storage medium. According to the technologies having been developed up to now, the red laser bean used as the light source causes no problem to the magnetic stability of the magnetic domain, even if the size of the magnetic domain in the recording layer is adjusted to a suitable size. However, in the recently-developed technologies, the other laser beams having shorter wavelengths such as a green, a blue, and a ultraviolet laser beams have caused the following problems as the size of the magnetic domain in the recording layer is further reduced to increase the density of recording of the magneto-optical storage medium.

When the size of the magnetic domain in the recording layer is reduced below a predetermined threshold size, a physical effect, the so-called 'super-paramagnetic effect' occurs, so that the magnetization characteristics of the storage medium may be lost. Therefore, it is necessary that the magnetic stability of the recording layer should be ensured in order to reduce the size of the magnetic domain.

On the other hand, in the conventional magneto-optical storage medium, development has been focused on the technology for improving reproduction characteristics of the reproducing layer rather than that for ensuring magnetic stability of the recording layer. FIGS. 1 and 2 are cross-sectional views illustrating conventional magneto-optical storage media.

Referring to FIG. 1, a first dielectric layer 110, a reproducing layer 120, a second dielectric layer 130, a recording layer 140, and a third dielectric layer 150 are sequentially stacked on a substrate 100. As shown in an enlarged view in the right side of the figure, the reproducing layer 120 consists of multiple layers including magnetic layers and non-magnetic layers. The magnetic layers are made up of one of Co, Fe, Ni, and an alloy containing thereof. The non-magnetic layers are made up of one of Pt, Pd, Ag, Au, and an alloy containing thereof. The purpose of this structure is to increase a resolution of a signal of the recording layer being transferred to the reproducing layer.

FIG. 2 shows a method of increasing the resolution of the signal of the recording layer 270 by magnificently transferring the coercive force, which is transferred from the recording layer 270 to the first reproducing layer 240, to the second reproducing layer 220.

Most of the conventional technologies have been oriented to a way of solving the following problem. When the size of the magnetic domain is reduced to increase the density of recording, noises are disadvantageously introduced into the adjacent magnetic domains in the process of reproducing the magnetic domain having a smaller size than the diameter of the reproducing beam which has a shape of a spot. As a result, there is a problem that the signal to noise ratio is relatively lowered to cause a reproduction error. However, the conventional technologies can not overcome the super-paramagnetic effect that occurs additionally when the size of the magnetic domain is reduced.

Therefore, in order to increase the density of recording, it is required to overcome the super-paramagnetic effect which occurs when the size of the magnetic domain is reduced below a threshold size by ensuring the stability of the magnetic domain in the recording layer rather than by improving the reproduction characteristics of the signal.

SUMMARY OF THE INVENTION

In order to solve the aforementioned problems, an object of the present invention is to provide a recording layer of a magneto-optical storage medium having a sublayer by forming the sublayer adjacent to the recording layer to increase a coercive force of the recording layer by an exchange coupling effect between the recording layer and the sublayer, thereby ensuring magnetic stability of the magnetic domain in the recording layer and miniaturizing the magnetic domain stably, and a method of fabricating the recording layer.

To achieve the above object, the magneto-optical storage medium in accordance with the present invention comprises, a recording layer on which information is recorded and stored; and a sublayer formed above or below the recording layer and made up of an alloy containing a transition metal, wherein a magnetic anisotropy energy of the sublayer is exchange-coupled to the recording layer, thereby enhancing a coercive force of the recording layer. The recording layer is made up of an RE-TM alloy containing a rare earth and a transition meta. For example, the recording layer is made up of one of TbFeCo, GdTbFe, etc. In addition, the sublayer is made up of alloy containing a transition metal of Co, Fe, Ni, etc. For example, the sublayer is made up of one of FePt, FePd, CoPt, CoPd, etc.

The sublayer may be formed in a single-layered structure having one layer, or if necessary, in a multi-layered structure having a plurality of layers. For example, the sublayer may be formed in a single-layered structure having an alloy containing Fe such as FePt, FePd, etc., or in a alternately-layered structure consisting of an alloy layer containing Fe such as FePt, FePd, etc and another alloy layer containing Co such as CoPt, CoPd, etc. Needless to say, the sublayer may be formed in a structure in which more than two alloys having same transition metal are alternately layered. For example, in case of the alloy containing Fe, the sublayer may formed in a structure in which two layers among FePt, FePd, FeAu, etc. are alternately layered. And, if necessary, the sublayer may be formed in a structure having more than three layers In accordance with an aspect of the present invention, the sublayer may be made up of an alloy containing a transition metal used for the recording layer. For example, in case of the recording layer being made up of TbFeCo, the sublayer may be formed in a single-layered structure having an alloy containing Fe such as FePt, FePd, FeAu, etc., or an alloy containing Co, such as CoPt, CoPd, CoAu, etc. In addition, as described above, the sublayer may be formed in a multi-layered structure. For example, in case of the recording layer being made up of TbFeCo, the sublayer may be formed in a multi-layered structure in which two layers among FePt, FePd, FeAu, CoPt, CoPd, CoAu, etc. is alternately layered In accordance with another aspect of the present invention, the sublayer is subject to thermal treatment to have a phase transition into a crystalline structure that has a big magnetic anisotropy. The magnetic anisotropy energy of the sublayer is coupled to the recording layer, so that the coercive force of the recording layer can be increased. For example, in case of the FePt sublayer, the sublayer is subject to thermal treatment to have a phase transition from an fcc (face centered cubic) structure to an fct (face centered tetragonal) structure that has a big magnetic anisotropy.

A method for fabricating a recording layer of a magneto-optical storage medium having a sublayer in accordance with the present invention comprises a step of forming a sublayer made up of an alloy containing a transition metal; a step of forming a recording layer on which information is recorded and stored, and a step of performing thermal treatment on the sublayer, wherein a crystalline structure of the sublayer is changed into a crystalline structure that has a big magnetic anisotropy by the step of performing the thermal treatment, so that a magnetic anisotropy energy of the sublayer is coupled to the recording layer.

DESCRIPTION OF THE PREFERRED EMBODIMENT

Hereinafter, embodiments of the present invention will be explained with reference to the accompanying drawings. Although the present invention has been described in conjunction with the preferred embodiment, the present invention is not limited to the embodiments, and it will be apparent to those skilled in the art that the present invention can be modified in variation within the scope of the invention.

Figure 1:
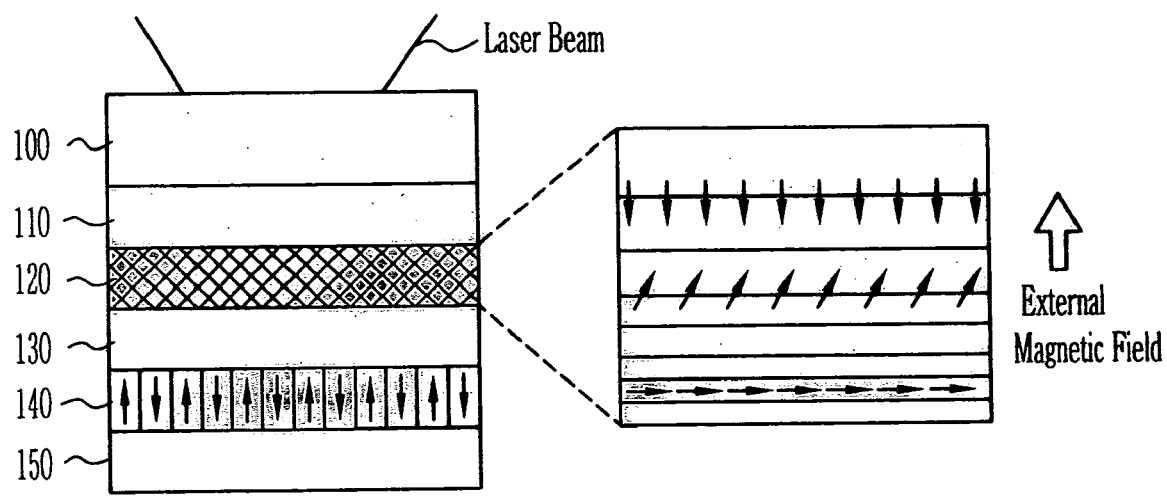
FIG. 1 is a cross-sectional view of a conventional magneto-optical storage medium by forming a plurality of sublayers in a reproducing layer of the magneto-optical storage medium, to improve a quality of a reproduction signal and a density of recording.
Figure 2:
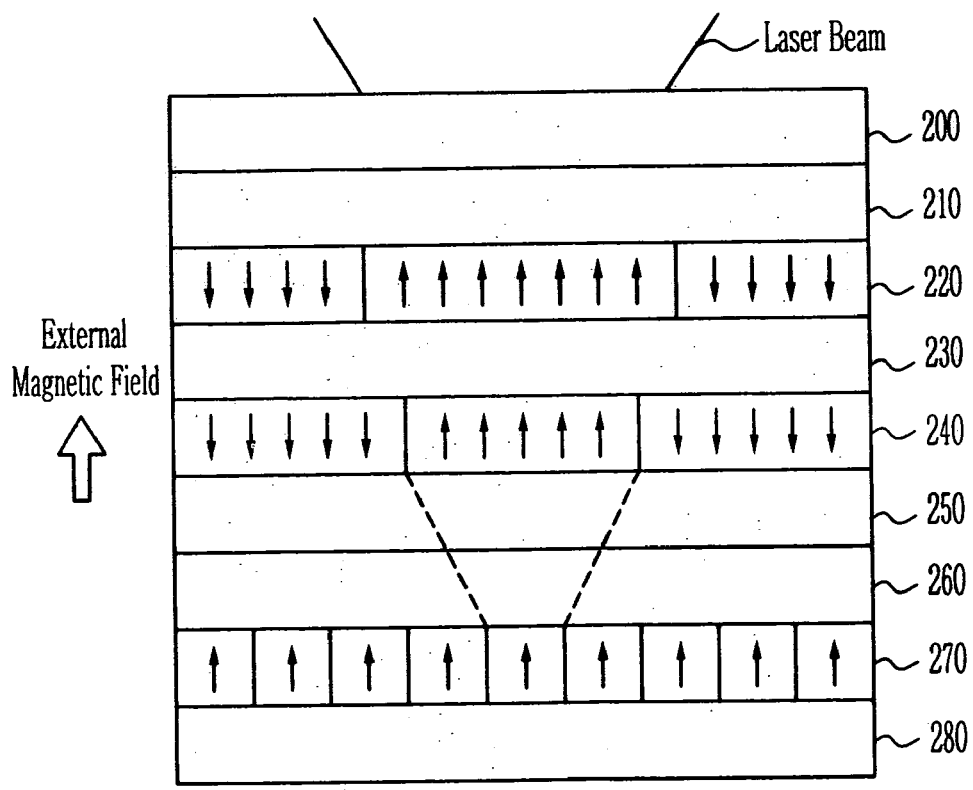
FIG. 2 is a cross-sectional view of a conventional magneto-optical storage medium by forming a plurality of reproducing layers having different coercive forces to improve a quality of a reproduction signal in the magneto-optical storage medium, thereby increasing a density of recording.
Figure 3:
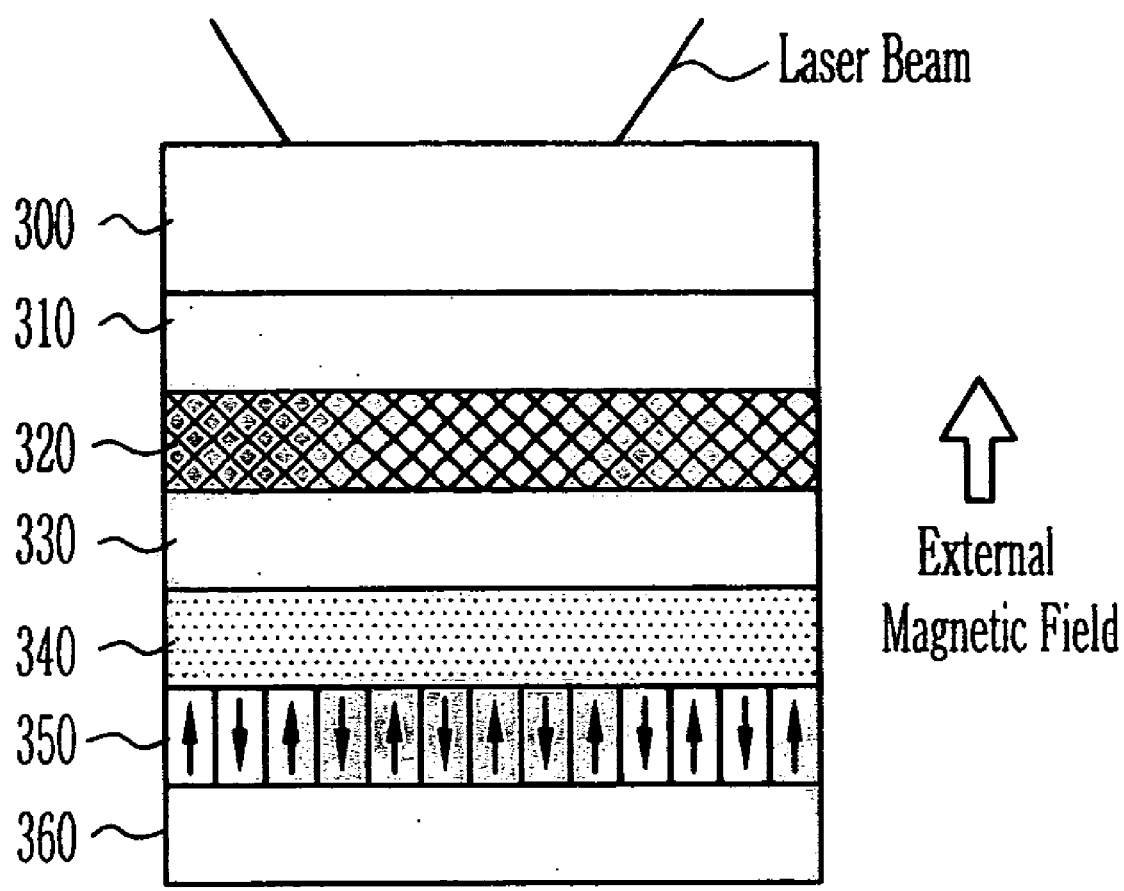
FIG. 3 is a cross-sectional view of a magneto-optical storage medium having a recording layer with a sublayer in accordance with the present invention.

FIG. 3 is a cross-sectional view illustrating an embodiment of a magneto-optical storage medium having a recording layer with a sublayer in accordance with the present invention. As shown in the figure, a first dielectric layer 310, a reproducing layer 320, a second dielectric layer 330, a sublayer 340, a recording layer 350, and a third dielectric layer 360 are sequentially stacked on a substrate 300 in the magneto-optical storage medium, as viewed from an incident direction of a laser beam. The present invention is characterized in that a coercive force of the recording layer 350 is increased by forming the sublayer 340 made of an alloy containing a transition metal, whereby magnetic stability of a magnetic domain in the recording layer is enhanced. Therefore, the recording layer in accordance with the present invention is not affected by a structure of dielectric layers and a reproducing layer shown in FIG. 3.

The principle of the present invention is as follows. In order to overcome the aforementioned super-paramagnetic effect which occurs when the size of the magnetic domain becomes smaller than a predetermined size, the sublayer which is made of one of transition metals or an alloy containing the transition metal is formed on the recording layer. And then, the sublayer is subject to a thermal treatment process to have a phase transition into a crystalline structure that has a big magnetic anisotropy. Therefore, the so-called exchange coupling effect that the magnetic anisotropy of the sublayer is coupled to the recording layer is induced. By the exchange coupling effect, the coercive force of the recording layer is increased, so that the magnetic stability of the magnetic domain in the recording layer can be increased. Accordingly, the size of the magnetic domain can be made smaller than that of the recording layer without the sublayer.

The recording layer of the magneto-optical storage medium in accordance with the embodiment of the present invention is made of TbFeCo. In addition, the sublayer may be made up of an alloy containing a transition metal. As described above, the sublayer may be made up of one of FePt, FePd, FeAu, CoPt, CoPd, and CoAu. The sublayer may be preferably made up of an alloy containing an element used for the recording layer of the magneto-optical storage medium since it is advantageous that the usage of the elements having a similar magnetization characteristic can increase the coercive force of the recording layer by the exchange coupling between the recording layer and the sublayer. Therefore, in case of the recording layer being made up of TbFeCo as the embodiment, it is preferable that the sublayer is made up of one of FePt, FePd, FeAu, etc., that is, an alloy containing Fe, or one of CoPt, CoPd, CoAu, etc., that is, an alloy containing Co, wherein Fe and Co are transition metals used for the recording layer. In addition, in case of the recording layer being made up of TbFeCo as embodiment, the sublayer may be made up of a metal alloy containing Ni in place of the transition metals of Fe and Co in the recording layer. Although it is preferable that the sublayer is made up of an alloy containing a transition metal used for the recording layer as described above, Ni has a magnetization characteristic similar to Fe, Co, so that it may be substituted for Fe, Co.

As shown in FIG. 3, the magneto-optical storage medium has a sublayer formed in a single-layered structure having a single layer. However, it is not necessary that the sublayer is formed in the single-layered structure. For example, in case of the recording layer being made up of TbFeCo, the sublayer may be formed in a single-layered structure consisting of FePt, or in a multi-layered structure consisting of alternate layers of FePt and CoPt.

Now, a method of fabricating the recording layer of the magneto-optical storage medium having a sublayer in accordance with the present invention will be described. In the method, the recording layer is made up of TbFeCo and the sublayer has a single-layered structure consisting of FePt. Referring to FIG. 3, a substrate 300 is formed. And then, a first dielectric layer 310, a reproducing layer 320, a second dielectric layer 330, a sublayer 340, a recording layer 350, and a third dielectric layer 360 are sequentially stacked on the substrate. The recording layer of the magneto-optical storage medium having the sublayer in accordance with the present invention may be coupled to various well known reproducing layers and dielectric layers shown. Therefore, the present invention is not limited by a method for forming the reproducing layers and dielectric layers.

The method for fabricating the recording layer of the magneto-optical storage medium in accordance with the present invention comprises a step of forming the sublayer, a step of forming the recording layer, and a step of performing thermal treatment. Alternatively, the step of thermal treatment may be performed between steps of forming the sublayer and the recording layer. Since the present invention is characterized in that the sublayer is subject to the thermal treatment to have a phase transition into a crystalline structure that has a big magnetic anisotropy, the present invention is not limited by whether the step of performing thermal treatment is performed after the step of forming the sublayer or after the step of forming the recording layer.

First, the step of forming the sublayer will be described. In case of the sublayer being made up of FePt, the sublayer may be formed in an alloy of FePt. Otherwise, the sublayer may be formed in an alternately-layered structure of Fe and Pt layers. After forming the sublayer, the recording layer is formed. And then, thermal treatment is performed at a temperature of 400 to 500° C. to generate a phase transition, so that Fe and Pt having an fcc (face centered cubic) structure is changed into FePt having an fct (face centered tetragonal) structure. In case of the sublayer being formed in the alternately-layered structure of Fe and Pt layers, the FePt sublayer is also formed in the fct structure by performing the thermal treatment similar to the case that the sublayer is made up of the alloy FePt with both elements of Fe and Pt infiltrating into each other. The temperature of the thermal treatment may be adjusted with a small difference depending on constitutional elements of the sublayer. For example, heat may be applied at a temperature of 400 to 600° C. in case of the sublayer being made up of Co or an alloy containing Co. Since the difference of the temperature is adjusted depending on the characteristics of constitutional elements of the sublayer, the present invention is not limited to the temperature of the aforementioned thermal treatment. The present invention is not characterized in the temperature itself applied in the step of performing thermal treatment. The present invention is characterized in that the sublayer is subject to the thermal treatment to have a phase transition into a crystalline structure that a has big magnetic anisotropy, whereby the magnetic anisotropy energy is coupled to the recording layer.

The sublayer of FePt formed through the above steps has a high magnetic anisotropy energy of about $7 \times 10^7$ erg/cm$^3$. The energy is coupled to the adjacent recording layer of TbFeCo, so that it can increase the coercive force of the recording layer.

As a result, the coercive force of the recording layer of the magneto-optical storage medium is increased greater than that of the case that the sublayer is not provided. By doing so, according to the present invention, it is possible to further reduce the threshold size of the magnetic domain in the recording layer at which the magnetic characteristics of the recording layer is lost by the super-paramagnetic effect. Accordingly, the size of the magnetic domain can be further reduced and the high coercive force of the magnetic domain can be maintained. Therefore, it is possible to improve the quality of the recording and reproducing of signals in the magnetic-optical storage medium.

In accordance with the recording layer of the magneto-optical storage medium having a sublayer of the present invention, the coercive force of the recording layer can be increased by the exchange coupling effect between the recording layer and its adjacent sublayer. The stability of the magnetic domain in the recording layer can be improved, whereby the size of the magnetic domain can be significantly decreased, and a density of recording can be increased.

What is claimed is:

1. A method for fabricating a magneto-optical storage medium having a sublayer, comprising steps of:
   forming the sublayer of an alloy containing a transition metal;
   forming a recording layer on which information is recorded and stored; and
   performing thermal treatment on the sublayer,
   wherein a crystalline structure of the sublayer is changed into a crystalline structure having a higher magnetic anisotropy by the step of performing the thermal treatment, so that the magnetic anisotropy energy of the sublayer is coupled to the recording layer and wherein a temperature in the step of performing thermal treatment is in a range of 300 to 600° C.

2. The method as claimed in claim 1, wherein the sublayer is an alloy containing a transition metal used for the recording layer.

3. The method as claimed in claim 1,
   wherein the recording layer comprises TbFeCo, and
   wherein the sublayer is an alloy containing one of Fe, Co, and Ni.

4. The method as claimed in claim 1,
   wherein the recording layer comprises TbFeCo; and
   wherein the sublayer comprises a first layer and a second layer, at least one of the first layer and the second layer comprising Fe.

5. A method for fabricating a magneto-optical storage medium having a sublayer, comprising steps of:
   forming the sublayer of an alloy containing a transition metal;
   forming a recording layer on which information is recorded and stored; and
   performing thermal treatment on the sublayer,
   wherein a crystalline structure of the sublayer is changed into a crystalline structure having a higher magnetic anisotropy by the step of performing the thermal treatment, so that the magnetic anisotropy energy of the sublayer is coupled to the recording layer;

wherein the recording layer comprises TbFeCo and the sublayer comprises FePt; and wherein a temperature in the step of performing thermal treatment is in a range of 300 to 500° C.

6. A method for fabricating a recording layer of a magneto-optical storage medium having a sublayer, comprising steps of:

forming a sub layer of an alloy containing a transition metal;

performing thermal treatment on the sublayer; and forming the recording layer on which information is recorded and stored, wherein a crystalline structure of the sublayer is changed into a crystalline structure having a higher magnetic anisotropy by the step of performing thermal treatment, so that the magnetic anisotropy energy of the sublayer is coupled to the recording layer and wherein a temperature in the step of performing thermal treatment is in a range of 300 to 600° C.

7. The method as claimed in claim 6, wherein the sublayer is made up of an alloy containing a transition metal used for the recording layer.

8. The method as claimed in claim 6, wherein the recording layer comprises TbFeCo, and wherein the sublayer is an alloy containing one of Fe, Co, and Ni.

9. A method for fabricating a recording layer of a magneto-optical storage medium having a sublayer, comprising steps of:

forming a sublayer of an alloy containing a transition metal;

performing thermal treatment on the sublayer; and forming the recording layer on which information is recorded and stored, wherein a crystalline structure of the sublayer is changed into a crystalline structure having a higher magnetic anisotropy by the step of performing thermal treatment, so that the magnetic anisotropy energy of the sublayer is coupled to the recording layer;

wherein the recording layer comprises TbFeCo and the sublayer comprises FePt; and wherein the temperature in the step of performing thermal treatment is in a range of 300 to 500° C.

* * * * *